United States Patent [19]

Edelmann

[11] Patent Number: 4,755,976
[45] Date of Patent: Jul. 5, 1988

[54] PROCESS AND APPARATUS FOR ANALYZING AND CONTROLLING ENERGY TRANSFER TO THE GROUND

[75] Inventor: Hans A. K. Edelmann, Hanover, Fed. Rep. of Germany

[73] Assignee: Prakla Seismos AG, Hanover, Fed. Rep. of Germany

[21] Appl. No.: 12,024

[22] Filed: Feb. 9, 1987

[30] Foreign Application Priority Data

Feb. 14, 1986 [DE] Fed. Rep. of Germany ....... 3604712

[51] Int. Cl.$^4$ ............................................ H04R 23/00
[52] U.S. Cl. ................................ 367/189; 324/83 FE
[58] Field of Search ................ 367/189, 190; 181/401, 181/113, 114, 121; 324/83 FE

[56] References Cited

U.S. PATENT DOCUMENTS 3,208,550  9/1965  Castaret et al. ...................... 367/190
4,184,144  1/1980  Rickenbacker ....................... 181/119

OTHER PUBLICATIONS

"Seismic Vibrator Control & the Downgoing P-wave," Sallas, J. J. Geophysics, vol. 49, #6, Jun. 1984, pp. 732-740.
"Amplitude & Phase Response of a Seismic Vibrator," Lerwill, W. E., Geophysical Prospecting, vol. 29, 1981, pp. 503-528.

Primary Examiner—Thomas H. Tarcza
Assistant Examiner—Ian J. Lobo
Attorney, Agent, or Firm—Walter C. Farley

[57] ABSTRACT

A method and apparatus for determining the occurrence and behavior of energy transference processes to the ground includes a vibrator which transfer seismic energy to the ground. Force and velocity signals are derived from acceleration signals measured at the baseplate and a reaction mass. The signals are filtered and multiplied together. The output components are separated and used for regulating the vibrator or for determining transference losses in the soil.

9 Claims, 2 Drawing Sheets

PHASE OF GROUND FORCE REFERRED
TO BASEPLATE ACCELERATION

ACTIVE (Pa) AND REACTIVE (Pr) POWER

PROCESS AND APPARATUS FOR ANALYZING AND CONTROLLING ENERGY TRANSFER TO THE GROUND

This invention relates to a process for determining the behavior of energy transfer processes wherein a vibrator transfers seismic energy into the ground and to an apparatus for performing the analysis and controlling the operation of the vibrator.

BACKGROUND OF THE INVENTION

In the last two decades, hydraulic vibrator devices have often been used instead of explosive seismic processes for transferring seismic energy into the earth in order, for example, to be able to research the subsurface characteristics of areas in which explosive seismic signal sources cannot be used or are undesirable. In order to inject seismic energy into the earth so that the signals can expand and provide reflections for analysis, the earth has been regarded, theoretically, as an elastic body. On this basis, it is necessary and sufficient to induce elastic stimulation of the subsoil in order to transfer seismic energy with as high a degree of efficiency as possible. For the purpose, vibrator plates are often attached to four-wheel drive trucks. These plates are driven by a vibrator drive signal which operates a hydraulic or other vibrating element coupled to the vibrator plate and the plate transfers the seismic energy to the soil.

With the aid of a lift system, the vibrator is positioned in its operating location against the ground. In order that the vibrator baseplate does not separate from the ground during vibration, it must be pressed down with a force which is larger than the force amplitude of the vibrator itself.

Because of the high pressures which appear near the baseplate of the vibrator, the soil compression often leads to a lasting deformation. In some cases, this deformation is initially desirable for reducing transference losses. These transference losses are caused by friction and transposition in the area of the baseplate. However, after the plate is positioned, only elastic deformation is desired.

When operating the vibrator on paved or high-surfaced ground, such as on streets, such prior placement or positioning is undesirable because it can lead to damage to the paved surface which should be avoided. Also, when the vibrator is operated and the soil is stimulated with increasing oscillating amplitude of the vibrator plate, a range of amplitudes can be achieved in which the elastic deformation gives way and leads to some plastic deformation of the subsoil which can also result in damage to the surface as well as to unpaved ground. The control of the change from elastic to plastic deformation of the subsoil is not as important to the degree of efficiency of seismic stimulation as it is to the avoidance of roadway damage.

Modern vibrators offer the possibility of measuring and monitoring the force imposed upon the ground. By using this dynamic force and in connection with the static load, the strain on the ground can be assessed. Regrettably, the permissible forces for any roadway structure cannot be provided precisely so that a determination of acceptable ranges which would allow protection against roadway damage with respect to safety factors and consistent with effective use of the vibrators for seismic purposes is, thus, not possible.

SUMMARY OF THE INVENTION

Accordingly, an object of the present invention is to provide a method and apparatus for determining the behavior of transference processes in soil which allow for the determination of the time and the intensity of the transference processes or other changes absorbing energy when the device is being operated and, thereby, avoidance of damage to the sub-structures.

A further object is to provide a process for developing a control signal which can be used to either monitor or control the vibrator system for optimum efficiency.

Yet another object is to provide an apparatus for developing a control signal which allows for optimum operation of the vibrator apparatus.

In one aspect, the invention includes a process for generating a signal representative of the force in an energy transfer process in which a power-driven vibrator transfers seismic energy to the ground by means of a baseplate supported against a reaction mass including the steps of measuring and producing signals which are representative of the acceleration components of the baseplate and the reaction mass, weighting each of the acceleration component signals in accordance with weighting factors proportional to the respective masses, summing the signals representative of the acceleration components to obtain a signal representative of the complex total force component, integrating the signal representative of measured acceleration of the baseplate to form a signal representative of baseplate velocity, and multiplying the force component signal with the baseplate velocity signal to form an output signal representative of the real force component of the energy transfer process.

In another aspect, the invention comprises an apparatus for producing a control signal representative of the real power of a power-driven vibrator baseplate coupled to the ground for injecting seismic energy into the earth comprising the combination of first acceleration sensor means connected to the baseplate for measuring the acceleration characteristics thereof and producing a signal representative of that acceleration.

A reaction mass is elastically supported against the baseplate and power drive means is provided for vibratorily driving either the baseplate or the reaction mass to ultimately vibrate the baseplate. A second acceleration sensor is connected to the reaction mass for measuring the acceleration of and for producing a signal representative of that acceleration. First circuit means connected to the first acceleration sensor integrates the signal produced by that first sensor to form a signal representative of the velocity of the baseplate. A second circuit means is connected to both of the first and second acceleration sensors for forming a signal representative of the complex force exerted by the baseplate on the ground, and multiplier circuit means is connected to the first and second circuit means for multiplying together the signals representative of complex force and velocity to produce a control signal representative of the real force component of the baseplate.

BRIEF DESCRIPTION OF THE DRAWING

In order to impart full understanding of the manner in which these and other objectives are attained in accordance with the invention, particularly advantageous embodiments thereof will be described with reference to the accompanying drawings, which form a part of this specification and wherein.

DESCRIPTION OF THE PREFERRED EMBODIMENT

Among the well-known methods of improving the signal level in a seismogram, the cheapest is the method of increasing the source output, but in most cases, this can also be the worst method. Increasing the source output, which means increasing the ground force at the interface between the vibrator baseplate and the soil, can lead to excessive damage without benefiting the seismic signal. More often, the seismic signal efficiency may be greatly lowered by this measure. The geophysicist's objective is not to obtain just a strong seismic signal but rather to have a well-defined seismic signal emitted in to the ground. Thus, one must consider the theoretical consideration about what goes on under the vibrator baseplate in order to understand the present invention which leads to the method and apparatus for operating a vibrator to achieve a strong and well-defined source signal.

As indicated above, the earth is commonly regarded as an elastic body for geophysical purposes. A vibrator baseplate acts on a flat surface of the ground with a ground force $F_g$ and has a velocity $V_b$. These quantities are related to each other only by the elastic constants of the ground. Following the elastic model theory, the ground reacts like a spring characterized by its compliance and its mass, which is called the radiation mass, and the energy is transformed into heat through its radiation resistance. These three quantities, radiation mass, compliance and radiation resistance, vary depending upon the type of soil in which the baseplate rests. Soft soil, for example, has a large compliance and a small resistance while hard soil has a small compliance and a large resistance but a small radiation mass. There are reliable laboratory data available from which the ground impedance can be calculated.

In practice, either the baseplate velocity or the ground force is selected as a reference signal. When dealing with a system such as VIBROSEIS the signals involved are harmonic oscillations so that it is possible to write a formula for the impedance in a complex form, having a real component and an imaginary component. As will be described, the formula shows that the imaginary component is a function of $\omega$ which means that it is a function of frequency as is the ground impedance itself. Since the impedance is a complex quantity, we must deal with the phase shift between ground force and baseplate velocity which is frequency dependent. Phase shift means time shift, and since we measure time in seismics, we must decide whether the reference will be ground force or baseplate velocity. It is also conceivable to use baseplate acceleration as a reference. However, there is a constant phase shift of 90° between velocity and acceleration by definition, so it is not necessary to be too concerned about the choice between these two factors.

Figure 1:
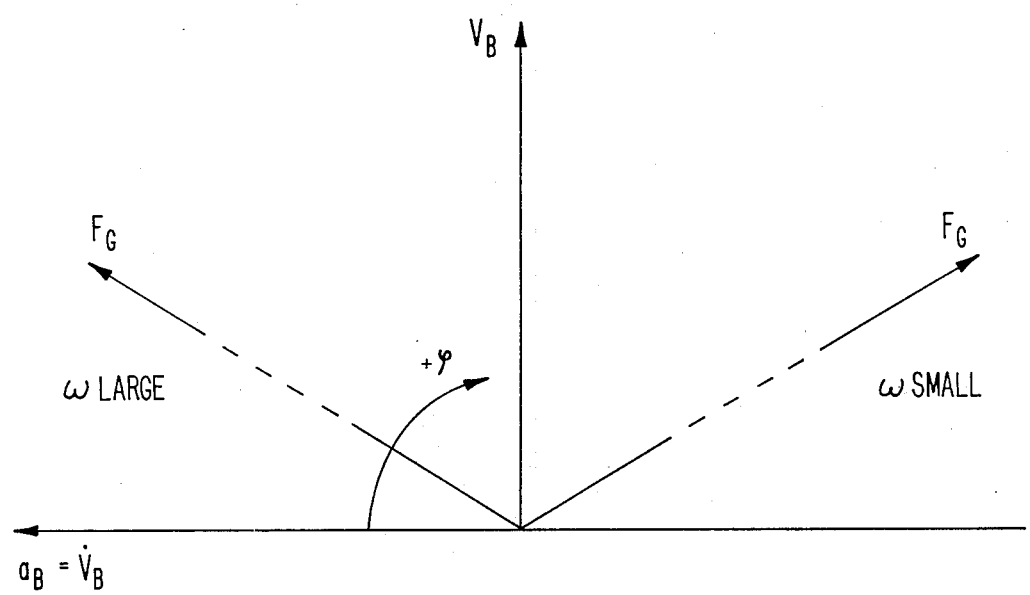
FIG. 1 is a polar diagram illustrating the phase relationships between force and velocity in a seismic vibrator.

The schematic polar diagram of FIG. 1 illustrates the principle of the phase relationship between acceleration, velocity and ground force. The phase angle $\delta$ between acceleration and ground force is large for low frequencies and small for high frequencies. That means that if baseplate acceleration is used for vibrator phase compensation, ground force may change from out-of-phase to nearly in-phase in the course of upsweep emission. The variation of the phase angle, which depends upon the elastic constants, can be calculated as a function of frequency, on a theoretical basis, for different materials. The theoretical calculations indicate that the phase angle varies very little with frequency on hard material and very much on soft material, reaching 90° for mud and sand but not for chalk over a range of frequencies normally of interest in seismic work.

Theory and reality are, of course, quite often two different things. Measurements of the phase angle for a vibrator standing on a soft meadow looks very much like that for mud. However, the phase characteristics of a vibrator on hard asphalt does not look very much different. Thus, it has been concluded that there are phenomena under the baseplate which cannot be described by the theoretical formula describing the elastic soil.

It is therefore clear that the theoretical predictions does not answer the question of which quantity measured at a vibrator should be used for phase control in order to best adapt VIBROSEIS results to the results gained with impulse sources such as dynamite. Ground force is a quantity which can be kept constant and fairly independent of the type of soil encountered along a seismic line so that ground force does not exceed the preload of the baseplate. A specific force amplitude on soft ground may cause great damage while on hard ground not a single crack will appear with that same force amplitude. Thus, the same force can cause different levels of active power, depending upon the velocity of the baseplate, the amplitude of the ground force and the phase angle between them.

Figure 2:
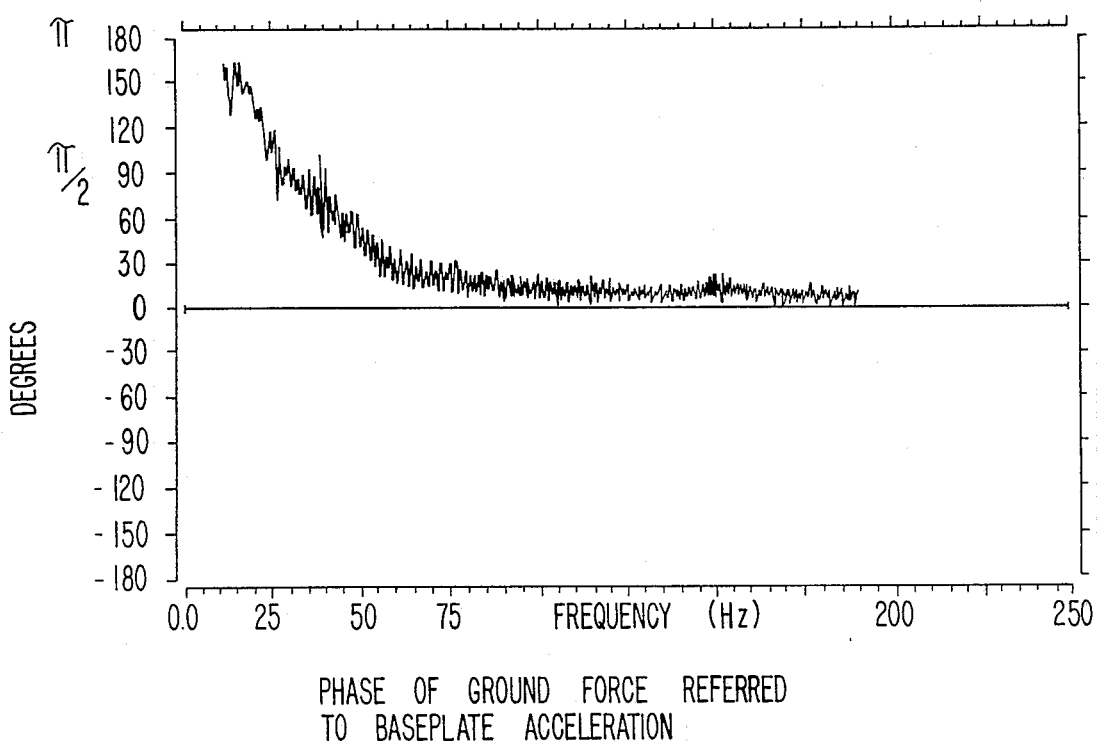
FIG. 2 is a representation of a typical phase angle vs. frequency relationship in a seismic vibrator.
Figure 3:
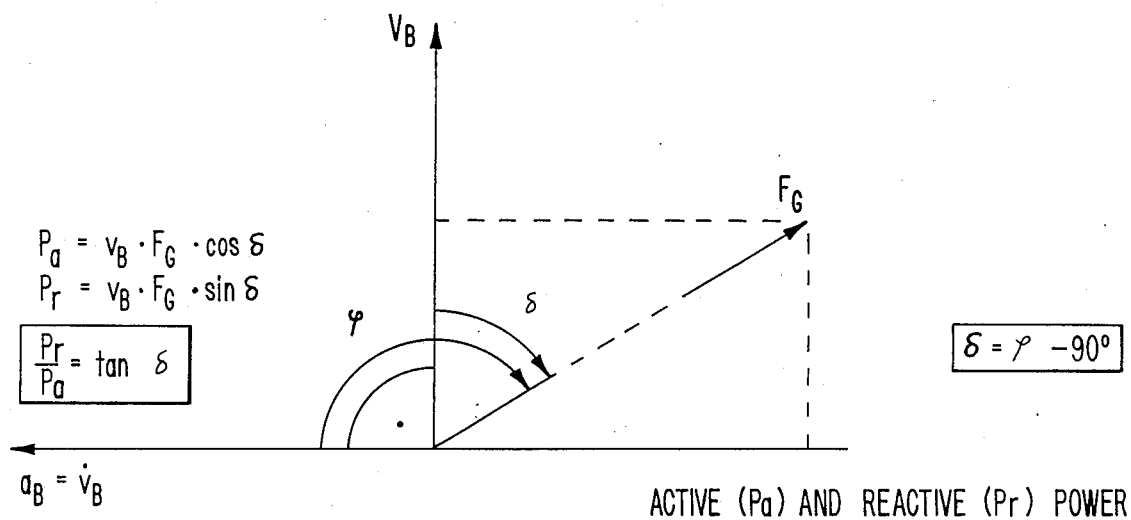
FIG. 3 is a diagram illustrating the relationships between velocity and force and the derivation of active (real) and reactive power.

FIG. 2 shows the phase relationship with frequency of the ground force from which it will be seen that the phase curve crosses the 90° line at a relatively low frequency. A 90° phase shift between baseplate acceleration and ground force means that ground force and baseplate velocity are in phase. In this specific case, all power emitted by the vibrator is active power. That means power which goes into the breaking up, particle motion, plastic deformation, air and pore fluid pumping. This active power depends upon the phase angle $\phi$ between velocity and ground force. A large angle $\phi$ means relatively low active power by high reactive power and a small angle $\phi$ means low reactive power and relatively high active power.

Measurements of the active power clearly indicate that it reaches values far greater than the theoretical values. For a broad band vibrator operating on sand, values of up to 30 kW have been reached. The maximum active power does not necessarily coincide with the 90° point.

Looking at the imprint of a vibrator on sand, it is clearly seen that much of the energy is transformed into displacement energy. For sandy ground, this means that the sand has flowed radially from under the baseplate to form a small ridge at the baseplate edges, indicating that plastic and not elastic deformation has taken place.

The baseplate soil model must thus be modified by introducing ground resistance $R_v$ which is dependent upon the frequency and also displacement of the baseplate. The region under the baseplate which is referred to as the visco-elastic pillow is more or less molded and extended depending upon the stiffness of the soil matrix pillow. This pillow enables good couplings to be formed between the baseplate and the ground, but it will be recognized that, when working on roads, considerable damage can result from the formation of such a pillow.

A related problem, thus, is how the pillow can be controlled to achieve good seismic results and at the same time avoid excessive damage. This has lead to the recognition of the fact that geophysicists are interested only in achieving elastic deformation and that all plastic deformation, which is synonymous with surface damage, is of no value. Consequently, the reactive power should be as large as possible while high active power should be avoided.

The ratio of reactive to active power is determined by the tangent of the phase angle $\delta$ between the ground force and the baseplate velocity. This ratio is very small in the range in which the phase angle between velocity and force is nearly zero. In this range, much of the power is active power with little reactive power. This has been observed from the amplitude characteristic of a seismic signal measured with the vertical component of a bore hole sonde at about 50 meters below the vibrator baseplate. In a frequency range between 30 hertz and 40 hertz, where the phase angle is near 90°, the amplitudes of the spectral components of the seismic signal are strongly reduced.

With the aid of the process of the invention, one can determine the time at which stimulation with seismic energy reaches a point where damage can appear in the substructure. The indicator of the effective performance components of the seismic stimulation can thus be used in an advantageous way for determining the threshold values for stimulating the ground in a permissible or possible manner without causing damage. Recognition of the appearance of an effective performance component also has the advantage of allowing one to maximize the reactive power output components which alone are valuable for seismic purposes.

The apparatus in accordance with the invention uses acceleration sensors at the baseplate from which measurements signals are derived which indicate the force and velocity components. These components are combined by arithmetic means in such a way as to form an output signal which corresponds to the effective output component of the energy transferred to the soil. In the case of vibrators used today, the baseplate is commonly supported against a reaction mass. The force component of the stimulation energy, therefore, is established by the addition of the weighted power components in accordance with their individual masses.

The effective output components indicated at the output can be used advantageously for controlling or regulating the amplitude of the control signal of the vibrator in order to regulate the reactive power output components to a maximum.

As indicated above, the process of the invention makes use of the effect of the reaction of the ground on the mechanical performance. During loss-free elastic reactions of the soil, a phase shift of 90° results between the pressure and the oscillation velocity of the soil which is assumed to be the same as the oscillation velocity of the baseplate. The phase shift decreases if thermal energy is generated in the subsoil and a loss output is emitted by a vibrator in this case which corresponds exactly to this thermal output. If transference processes also occur in the subsoil, or if the shearing strength of the subsoil is exceeded, then mechanical outputs are also emitted. Thermal and mechanical outputs are not desired.

Based on the process of the invention, the force and velocity components are derived at the baseplate of the vibrator and are multiplied together. The same proportion of the resulting output signal is used for displaying the behavior of transference processes.

Figure 4:
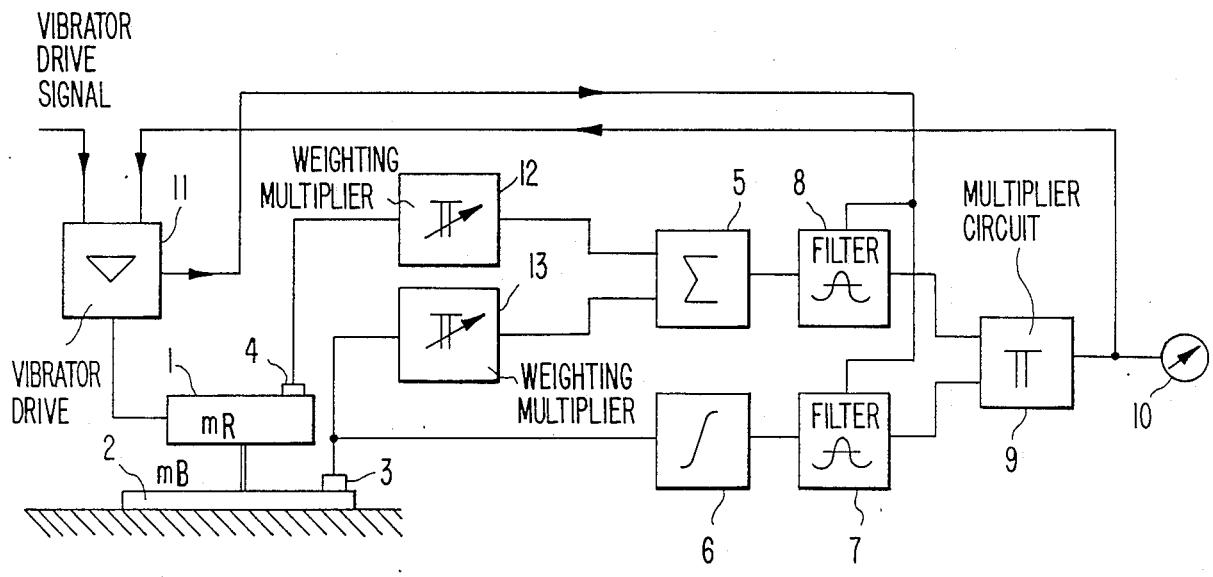
FIG. 4 is a schematic block diagram of an apparatus in accordance with the invention.

The output signal results in the following way, referring to FIG. 4. A vibrator drive signal is applied to a vibrator drive unit 11 which is coupled to the reaction mass 1. The reaction mass is elastically connected to, and supports, the baseplate 2. An acceleration sensor 3 is connected to the baseplate and an acceleration sensor 4 is connected to the reaction mass so that these sensors can produce outputs representative of the accelerations of their respective bodies. The output signals of these sensors are added after being weighted in weighting multiplier circuits 12 and 13, the weighting factors being constants which correspond to the masses of the respective bodies to which they are attached. Thus, the weighted output signals from multipliers 12 and 13 are supplied to summing circuit 5 which produces an output signal representative of force F in which $$F = |M_R \cdot a_R| + |M_B \cdot a_B|$$

wherein
 $m_R$ = mass of the reaction mass,
 $m_B$ = mass of the baseplate,
 $a_R$ = acceleration of the reaction mass, and
 $a_B$ = acceleration of the baseplate.

The output signal of summing circuit 5 thus corresponds to the force components of the emitted output. This is a changing, sine-shaped signal which has the value $F = F_{max} \cdot \cos \omega t$. The baseplate acceleration signal is fed to an integrator 6 at the output of which appears the velocity signal of the baseplate 2. The velocity signal is also a sine-shaped function which can be represented by the relationship $V_B = V_{Bmax} \cdot \cos (\omega t + \phi)$. This velocity component is phase shifted by the angle $\phi$ with respect to the force component.

The power and velocity components are passed through filters 7 and 8 and are then multiplied together in a multiplying circuit 9, resulting in a signal which can be represented by the following expression for the instantaneous value of this output:

$$P = F \cdot V_B = F_{max} \cdot \cos \omega t \cdot V_{Bmax} \cdot \cos (\omega t + \phi)$$

The output signal thus corresponds to $$P = \tfrac{1}{2} F_{max} \cdot V_{Bmax}(\cos\phi + \cos(2\omega t + \phi))$$
$$P = \tfrac{1}{2}(F_{max} \cdot V_{Bmax} \cdot \cos\phi) + \tfrac{1}{2}(F_{max} \cdot V_{Bmax} \cdot \cos(2\omega t + \phi)).$$

From this it will be seen that the measured output includes a constant coefficient which can be identified as the real output with a constant phase angle, and a component which oscillates with the double circular frequency $2\omega$.

During plastic deformation and transference of the ground, energy is transferred which is derived from the system. This output corresponds to the measured real output component. Therefore, this part constitutes $$P_R = \tfrac{1}{2} F_{max} V_{Bmax} \cos \phi$$

Accordingly, the $P_R$ value forms a measure of the degree of plastic deformation and transference and, thereby, for the effects on the soil caused by the force F. The real output components of the output transferred to the soil in this way can be used advantageously, along with a display for regulating and controlling the control signal of the vibrator, in order to avoid the generation of the real output components at all and to maximize, on the other hand, the reactive output component.

As previously indicated, the apparatus of the invention employs the outputs of sensors 3 and 4 with the signals being weighted and then applied to the summing circuit. The weighting in circuits 12 and 13 can be accomplished by adjusting the amplification factors of operational amplifiers used in circuits 12 and 13 in accordance with the masses of the bodies to which the respective sensors are attached.

The integrator 6 which receives the acceleration signal from sensor 3 attached to baseplate 2 can also be realized by an operational amplifier. The output signals of the summing circuit and integrator 6 are fed to multiplying circuit 9, the output of which can be indicated directly by an indicator 10, which output can be the voltage U representing the real output component after separation of the reactive component which oscillates with double circular frequency.

The same proportion of the output signal can be displayed directly in a direct current rectification instrument or separated by electronic means.

Frequency band pass filters 7 and 8, which are shown inserted between the summing circuit 5, integrator 6 and multiplying circuit 9 can be designed as low pass or band pass filters. The frequency response characteristics of filters 7 and 8 can be controlled by the control signal of the vibrator in order to achieve a shift in the corner positions of the filter frequency response during stimulation of the vibrating mass by means of sweep signals.

Such filters are identified in the drawings as band pass filters. Both filters are preferably very similar in their configuration so that the phase shifts caused by the filters for the power and velocity are of the same magnitude.

The output signal can be fed back to control unit 11 of the vibrator from the output of multiplier circuit 9 in order to allow control or automatic regulation of the vibrator.

The individual circuit components of the apparatus of the invention can be constructed using analog circuitry as suggested by the drawing, but it is also possible to accomplish the same processing using a computer system, which system is normally available in a vibrator vehicle.

While certain advantageous embodiments have been chosen to illustrate the invention, it will be understood by those skilled in the art that various changes and modifications can be made therein without departing from the scope of the invention as defined in the appended claims.

What I claim is:

1. A process for generating a signal representative of the active power in an energy transfer process wherein the active power is the component of the total power which tends to deform the ground wherein a power-driven vibrator transfers seismic energy to the ground by means of a baseplate supported against a reaction mass, including the steps of measuring and producing signals representative of the acceleration components of the baseplate and the reaction mass, weighting each of the acceleration component signals in accordance with weighting factors proportional to the respective masses, summing the signals representative of the acceleration components to obtain a signal representative of the complex total force component, integrating the signal representative of measured acceleration of the baseplate to form a signal representative of baseplate velocity, and multiplying the signal representative of the complex total force component with the signal representative of baseplate velocity to form an output signal representative of the active power component of the energy imparted to the earth in the transfer process.

2. A process in accordance with claim 1 wherein said output signal is coupled to the power drive for the vibrator to control the amplitude of the vibrator drive signal.

3. A process according to claim 2 and including, before the step of multiplying, passing the baseplate acceleration component and the total force component through adjustable bandpass filters, producing a frequency signal representative of the frequency of the vibrator power drive, and controlling the passband characteristics of the filters in accordance with the frequency signal.

4. An apparatus for producing a control signal representative of the active power imparted to the earth of a power-driven vibrator baseplate coupled to the ground for injecting seismic signal energy into the earth and wherein the active power is the component of the total power which tends to deform the ground comprising the combination of first acceleration sensor means connected to said baseplate for measuring the acceleration thereof and producing a signal representative of the baseplate acceleration;

a reaction mass elastically supported against said baseplate;

power drive means for vibratorily driving one of said baseplate and said reaction mass;

second acceleration sensor means connected to said reaction mass for measuring the acceleration thereof and for producing a signal representative of the reaction mass acceleration;

first circuit means connected to said first acceleration sensor means for integrating said signal produced by said sensor means to form a signal representative of the velocity of said baseplate;

second circuit means connected to said first and second acceleration sensor means for forming a signal representative of the complex force exerted by said baseplate on the ground; and multiplier circuit means connected to said first and second circuit means for multiplying together said signals representative of complex force and velocity to produce a control signal representative of the active power component of said baseplate.

5. An apparatus according to claim 4 and including third circuit means for connecting said control signal to said power drive means to limit the amplitude of the drive signal applied to said reaction mass and baseplate such that the amplitude of the drive signal is reduced when said control signal exceeds a predetermined value.

6. An apparatus according to claim 4 wherein each of said first and second circuit means includes a filter having a predetermined frequency response characteristic.

7. An apparatus according to claim 4 wherein each of said first and second circuit means includes a bandpass filter having adjustable frequency response characteristics, said apparatus further including fourth circuit means for producing a frequency signal representative of the frequency of the vibrator power drive and coupling said signal to each of said bandpass filters for controlling the bandpass characteristics thereof.

8. An apparatus according to claim 7 and further including means for displaying the amplitude of said control signal.

9. A process according to claim 1 and further including the step of applying the output signal representative of the active power component to the power drive for the vibrator to minimize the active power component applied to the baseplate.

* * * * *